United States Patent Office 3,407,238
Patented Oct. 22, 1968

3,407,238
PROCESS FOR THE PREPARATION OF
CYCLODODECADIENES
Nazzareno Cameli, Guido Sartori, and Renato Sudati,
Milan, Italy, assignors to Montecatini Edison S.p.A.,
Milan, Italy
No Drawing. Filed Sept. 7, 1966, Ser. No. 577,622
Claims priority, application Italy, Sept. 13, 1965,
20,244/65
4 Claims. (Cl. 260—666)

ABSTRACT OF THE DISCLOSURE

Preparing trans,trans-cyclododecadiene-1,5 and cis, trans-cyclododecadiene-1,3 by contacting cis,trans-cyclododecadiene-1,5 with iron carbonyl at about 140–160° C. or with nickel salt and aluminum alkyl compound at about 60–80° C.

---

The present invention relates to the preparation of trans,trans-cyclododecadiene-1,5 (compound II hereinafter) and cis,trans-cyclododecadiene-1,3 (compound III) starting from cis,trans-cyclododecadiene-1,5 (compound I).

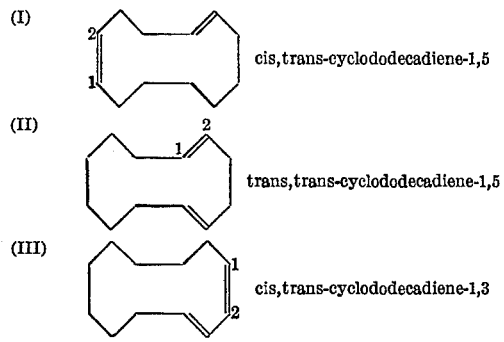

(I) cis,trans-cyclododecadiene-1,5

(II) trans,trans-cyclododecadiene-1,5

(III) cis,trans-cyclododecadiene-1,3

Ironcarbonyls, in particular $Fe(CO)_5$, or nickel compounds activated with aluminum alkyl compounds, are used as catalysts in the preparation of the compounds according to the methods of the present invention.

Suitable nickel compounds include salts of organic acids, e.g., nickel acetylacetonate, benzoylacetonate, acetate, oxalate, benzoate or the like or salts of inorganic acids such as, e.g., nickel chloride, nitrate, sulfate, or the like.

Suitable aluminum alkyl compounds are e.g. aluminumdiethylchloride, aluminumdiethylbromide, aluminumdiisobutylchloride and aluminumtriisobutyl.

If desired, the nickel compounds may advantageously be complexed with electron donor compounds, such as organic compounds of trivalent phosphorus, e.g. phosphines and phosphites.

The compound I, optionally in a hydrocarbon solvent, is heated in the presence of the catalyst for 2–40 hours. Where the catalyst is ironcarbonyl the temperature of heating is desirably from about 140 to 160° C. If an activated nickel compound is used as the catalyst, the heating is desirably carried out at from about 60 to 80° C.

The molar ratio of the ironcarbonyl to compound I is desirably maintained within the range from about 0.05:1 to 0.2:1. Where a nickel compound is employed the molar ratio of the nickel compound to compound I is desirably from about 0.01:1 to 0.1:1.

The compounds obtained by the method of this invention may be separated by chromatography.

The cyclododecadienes produced by the method of the present invention are useful as intermediates in organic syntheses, in particular in the preparation of oxygenated and halogenated derivatives, and in polymerization reaction.

The following examples will further illustrate this invention.

Example 1

48 cc. of trans,cis-cyclododecadiene-1,5 and 6 cc. of ironpentacarbonyl $[Fe(CO)_5]$ were introduced, under a nitrogen atmosphere, into a 100 cc. three-necked flask, provided with a stirrer and reflux cooler.

The whole was heated at 150° C. for 18 hours.

Chromatographic analysis showed the presence of a band corresponding to the starting cyclododecadiene (compounds I) and of two new bands. The three compounds I, II, and III were present in the following molar ratios:

I, 2.76; II, 2.9; III, 1

Compounds II and III were each separated in the pure state by preparative gas chromatography, carried out using a column containing chromosorb P and polyethyleneglycol ($t=165°$ C.). The compounds were then examined by infrared spectrography. The absorption spectrum of compound II showed the presence of trans type unsaturations (band at 965 cm.$^{-1}$). Its refractive index measured at 25° C., was 1.4935, this value being virtually identical to the value given in the literature for trans, trans-cyclododecadiene-1,5. The infrared absorption spectrum of compound III showed the presence of conjugated trans type unsaturations (band at 982 cm.$^{-1}$ and cis type unsaturated (band at 708 cm. $^{-1}$). Furthermore, the ultraviolet spectrum of this compound showed a main absorption maximum at 237 m$\mu$. These data are in agreement with the data in the literature for trans-cis-cyclododecadiene-1,3.

Example 2

2 cc. of trans,cis - cyclododecadiene - 1,5. 0.1 g. of $NiCl_2.2Bu_3P$ (Bu=butyl) and 6 cc. of anhydrous n-heptane were introduced, under a nitrogen atmosphere into a 100 cc. flask, provided with agitator and cooler.

The whole was heated at 67–70° C. and 0.28 cc. of aluminumdiisobutyl-monochloride was then gradually added.

The heating was interrupted after 20 hours. Chromatographic analysis of the crude showed the presence of a band due to the starting cyclododecadiene and of a band corresponding to trans,trans-cyclododecadiene-1,5 (compound II). The two compounds were in the molar ratio of 1:1 to one another.

Variations can of course be made without departing from the spirit of the invention.

Having thus described our invention, what we desire to secure and claim by Letters Patent is:

1. A method of making trans,trans-cyclododecadiene-1,5 and cis,trans-cyclododecadiene-1,3 consisting essentially of contacting cis,trans-cyclododecadiene-1,5 with a catalyst consisting of iron pentacarbonyl at a temperature of from about 140 to 160° C., said catalyst being present in an amount of from about 0.05 to 0.2 mole per mole of said cis,trans-cyclododecadiene-1,5.

2. A method of making trans,trans-cyclododecadiene-1,5 consisting essentially of contacting cis,trans-cyclododecadiene-1,5 with a catalyst consisting of a nickel salt selected from the group consisting of nickel acetylacetonate, nickel benzoylacetonate, nickel acetate, nickel oxalate, nickel benzoate, nickel chloride, nickel nitrate and nickel sulfate activated with an aluminum alkyl compound selected from the group consisting of aluminum diethyl chloride, aluminum diethyl bromide, aluminum diisobutyl chloride and aluminum triisobutyl at a temperature of from about 60 to 80° C., said activated nickel salt catalyst being present in an amount of from about 0.01 to 0.1 mole per mole of said cis,trans-cyclododecadiene-1,5.

3. The method of claim 1 wherein the heating is carried out in an n-heptane solution.

4. The method of claim 2 wherein the heating is carried out in an n-heptane solution.

References Cited

UNITED STATES PATENTS

| 3,247,270 | 4/1966 | Kirk | 260—666 |
| 3,249,641 | 5/1966 | Storrs | 260—666 |
| 3,304,269 | 2/1967 | Kroll | 260—2 |
| 3,317,620 | 5/1967 | Wilke | 260—666 |

OTHER REFERENCES

J. E. Arnett et al., J. Amer. Chem. Soc., 83, pages 2954–5, 1961.

DELBERT E. GANTZ, *Primary Examiner.*

V. O'KEEFE, *Assistant Examiner.*